United States Patent
Nishimura

(10) Patent No.: US 7,869,135 B2
(45) Date of Patent: Jan. 11, 2011

(54) ZOOM LENS AND IMAGE PICKUP APPARATUS HAVING THE SAME

(75) Inventor: Takeshi Nishimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/566,026

(22) Filed: Sep. 24, 2009

(65) Prior Publication Data

US 2010/0128360 A1    May 27, 2010

(30) Foreign Application Priority Data

Nov. 27, 2008    (JP)    ............... 2008-302236

(51) Int. Cl.
*G02B 15/14*    (2006.01)
(52) U.S. Cl. .............. 359/680; 359/676; 359/682; 359/683; 359/684; 359/685; 359/691; 359/717; 359/740; 359/793
(58) Field of Classification Search ........... 359/676, 359/680, 682–685, 691, 717, 740, 793
See application file for complete search history.

(56) References Cited

U.S. PATENT DOCUMENTS

| | | | |
|---|---|---|---|
| 6,081,389 A | 6/2000 | Takayama | |
| 6,229,655 B1 | 5/2001 | Kohno | |
| 6,452,729 B2 * | 9/2002 | Yamamoto | ............... 359/676 |
| 6,862,143 B2 * | 3/2005 | Hoshi et al. | ............... 359/680 |
| 6,992,835 B2 | 1/2006 | Iwasawa | |
| 7,113,347 B2 * | 9/2006 | Nanba et al. | ............... 359/680 |
| 7,113,348 B2 * | 9/2006 | Nanba et al. | ............... 359/680 |
| 7,227,701 B2 * | 6/2007 | Nanba et al. | ............... 359/680 |
| 7,436,449 B2 * | 10/2008 | Mihara | ............... 359/738 |
| 2002/0191306 A1 * | 12/2002 | Toyama | ............... 359/689 |

FOREIGN PATENT DOCUMENTS

| | | |
|---|---|---|
| JP | 6-273670 A | 9/1994 |
| JP | 2000-330024 A | 11/2000 |
| JP | 2001-042217 A | 2/2001 |
| JP | 2002-072091 A | 3/2002 |
| JP | 2003-177314 A | 6/2003 |
| JP | 2006-058584 A | 3/2006 |
| JP | 2007-156043 A | 6/2007 |

\* cited by examiner

*Primary Examiner*—Evelyn A. Lester
(74) *Attorney, Agent, or Firm*—Canon U.S.A., Inc. I.P. Division

(57) ABSTRACT

A zoom lens includes, in order from an object side to an image side, a first lens unit having a negative refractive power and a second lens unit having a positive refractive power. In the zoom lens, an interval between the first and second lens units becomes smaller at a telephoto end than at a wide-angle end during zooming. The first lens unit includes, in order from the object side to the image side, a first lens having a negative refractive power, a second lens having a negative refractive power, which is made of a plastic and has an aspheric lens surface, and a third lens unit having a positive refractive power. In the zoom lens, a refractive index and an Abbe number of the plastic (Nd, vd), a focal length of the second lens (fn), and a focal length of the first lens unit (f1) are appropriately set.

10 Claims, 16 Drawing Sheets

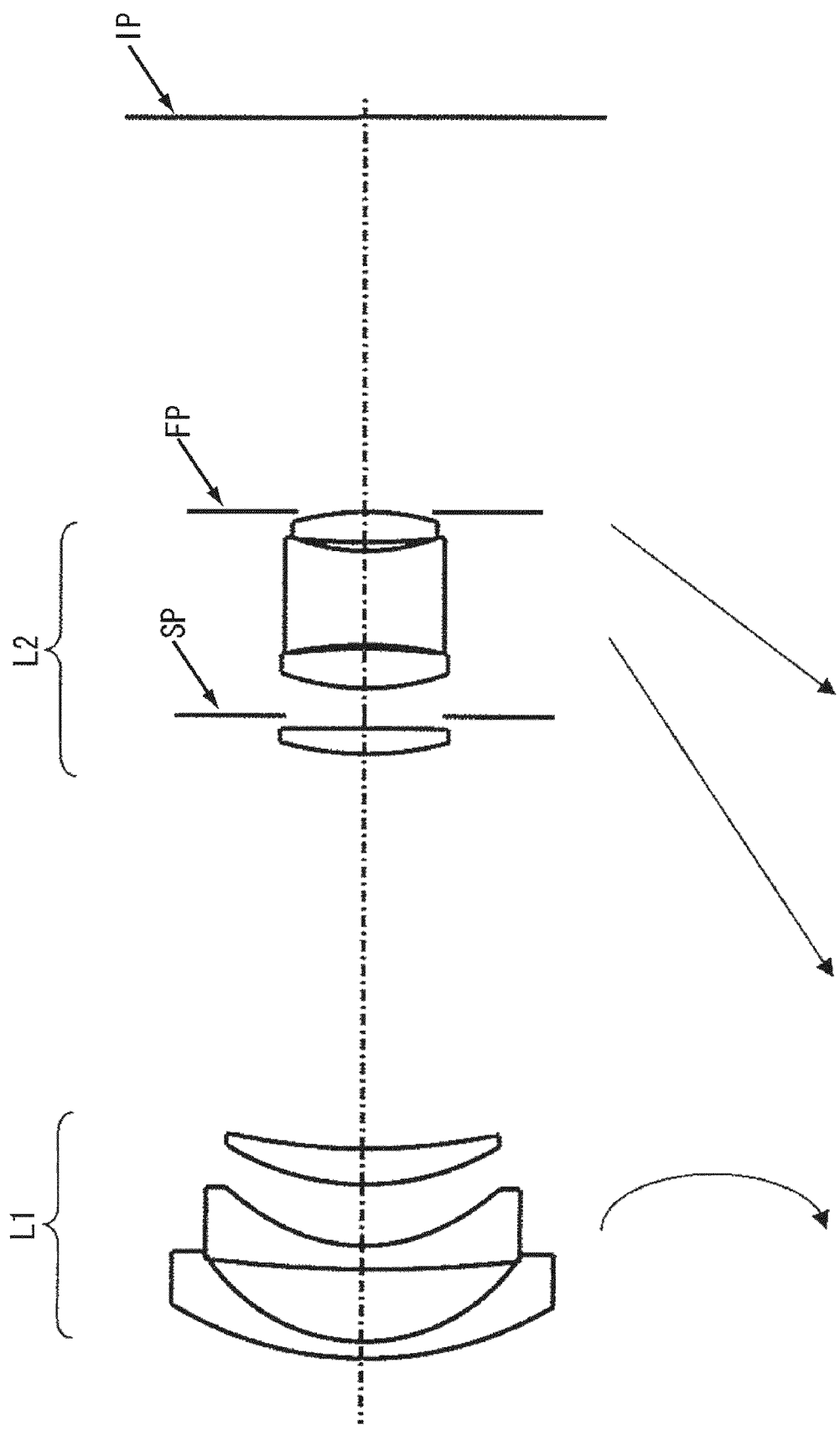

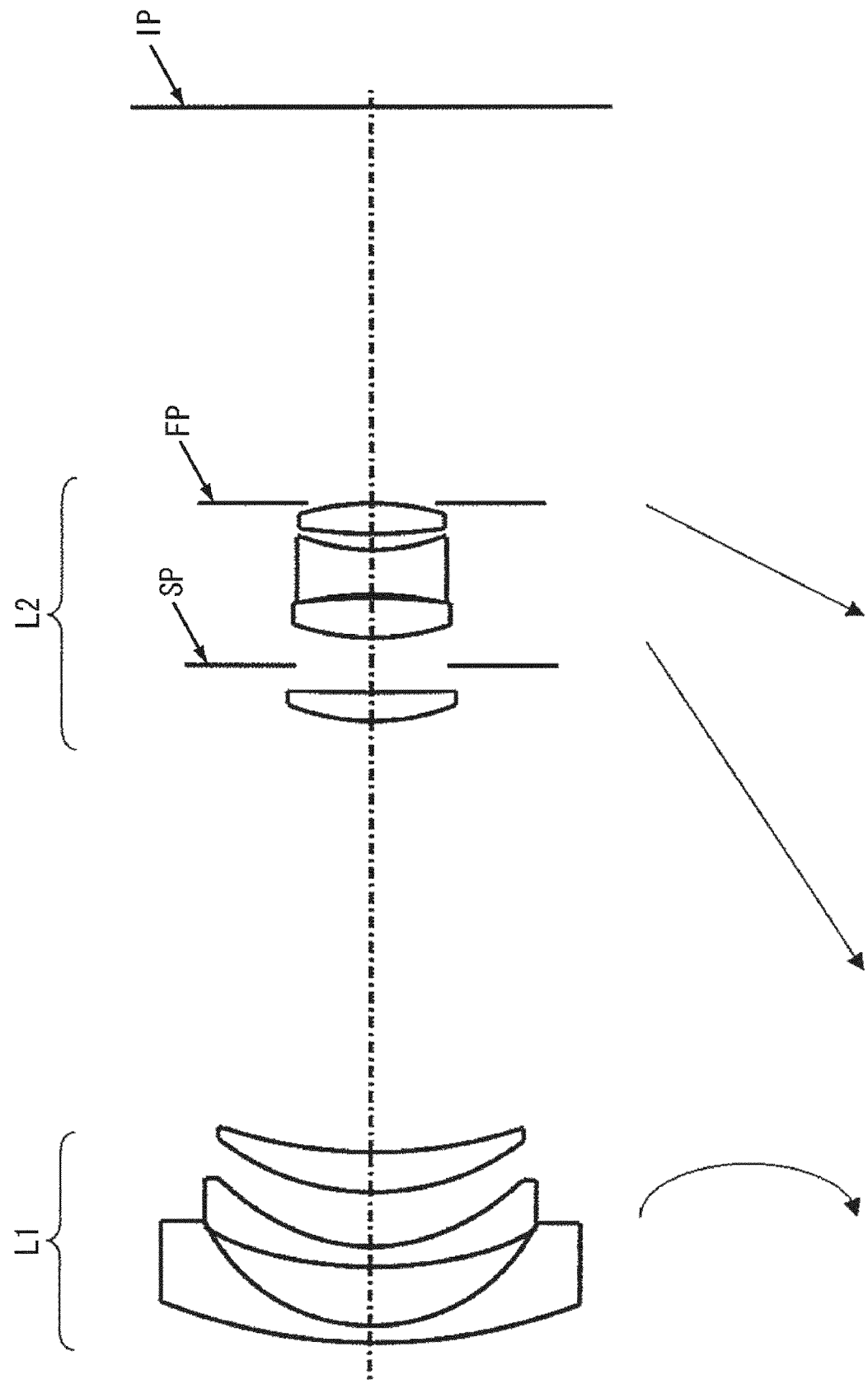

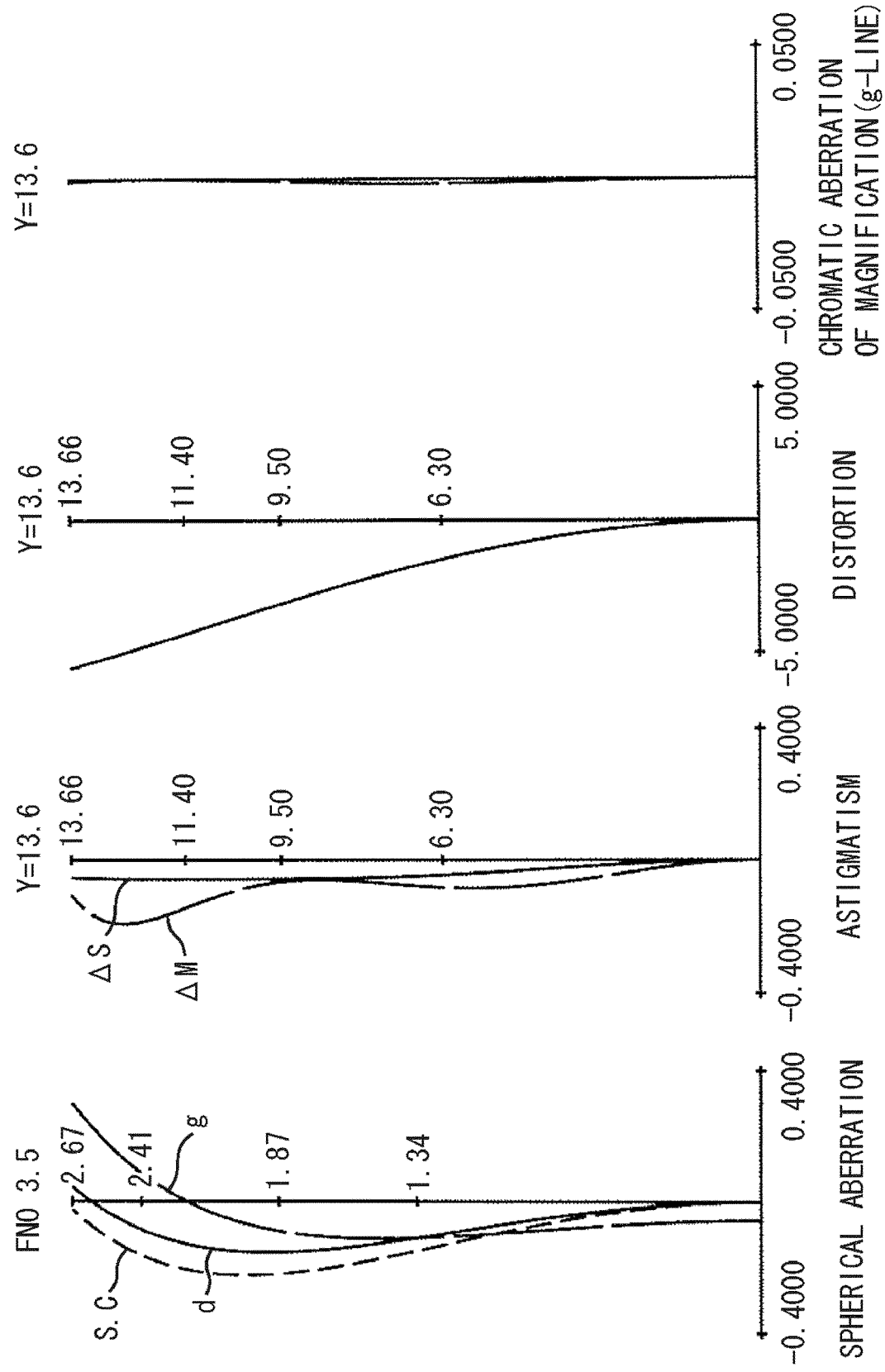

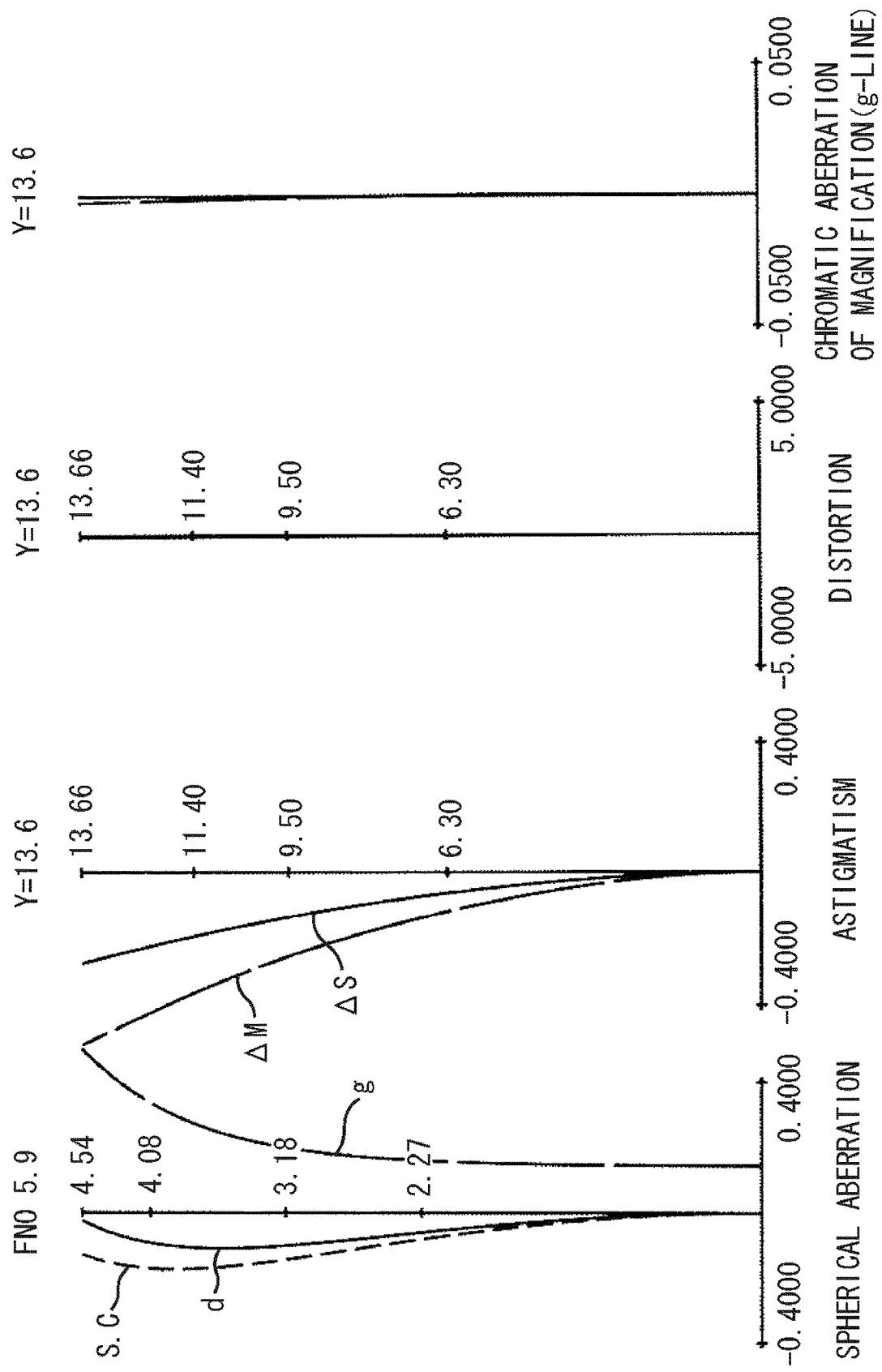

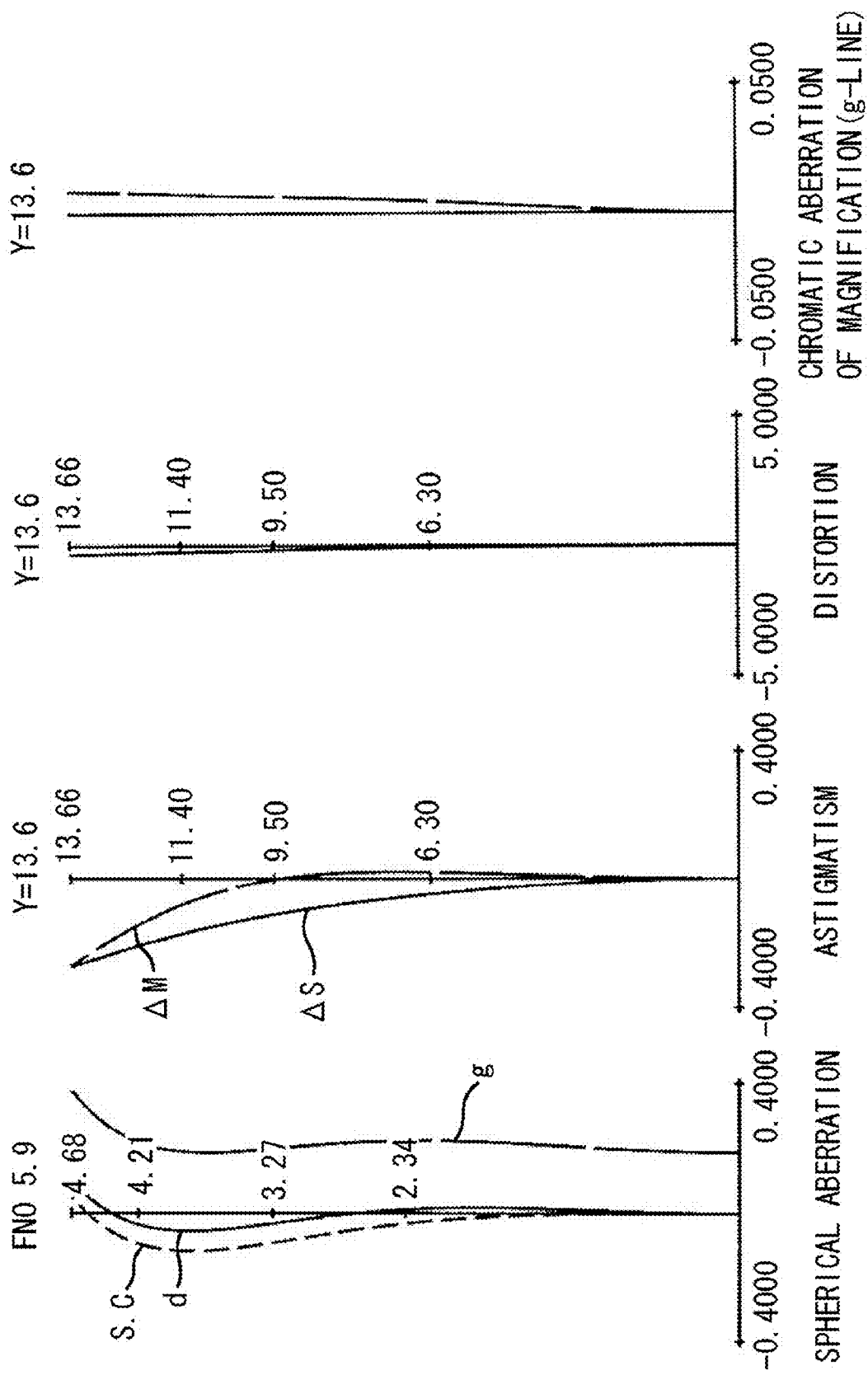

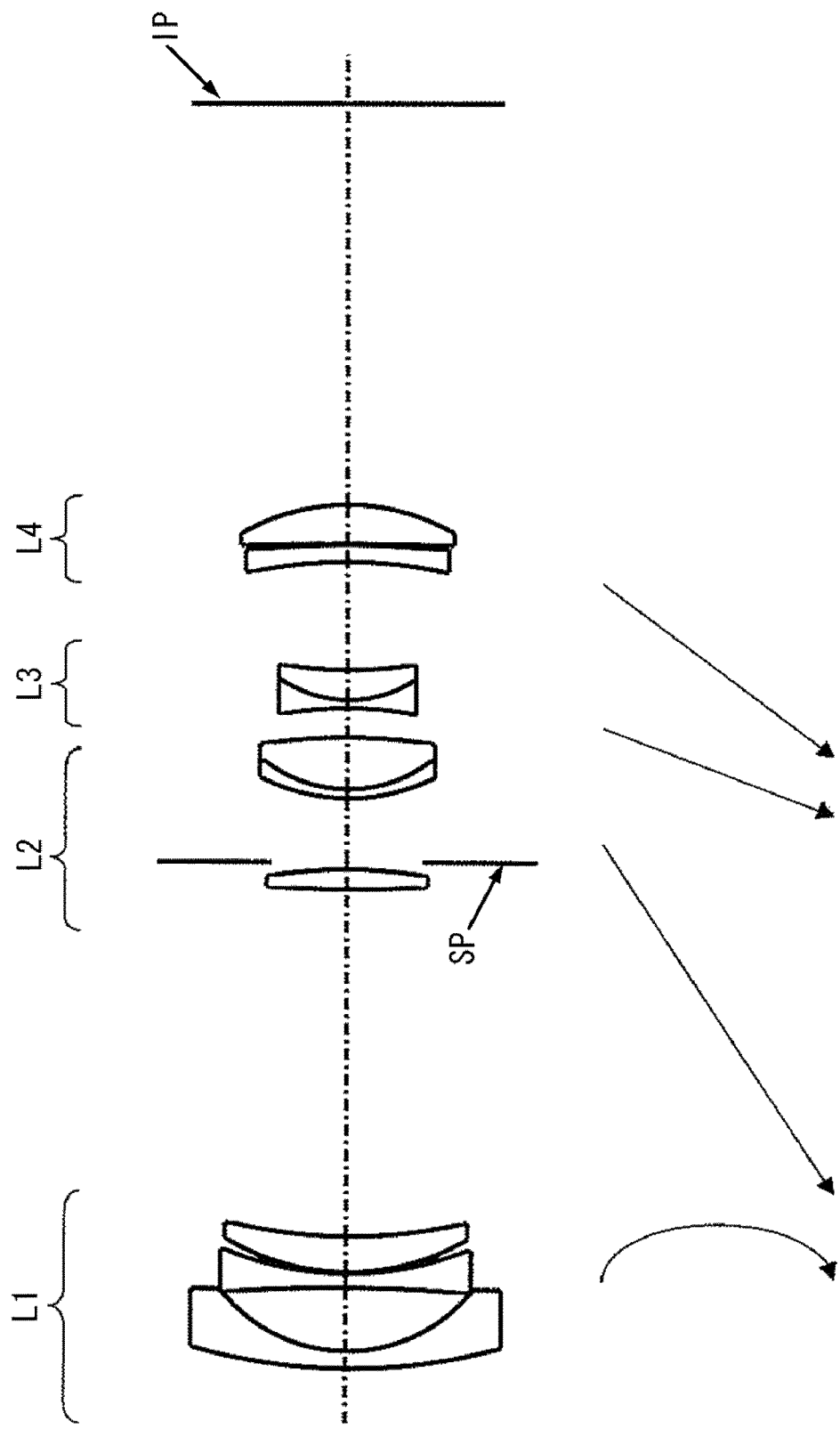

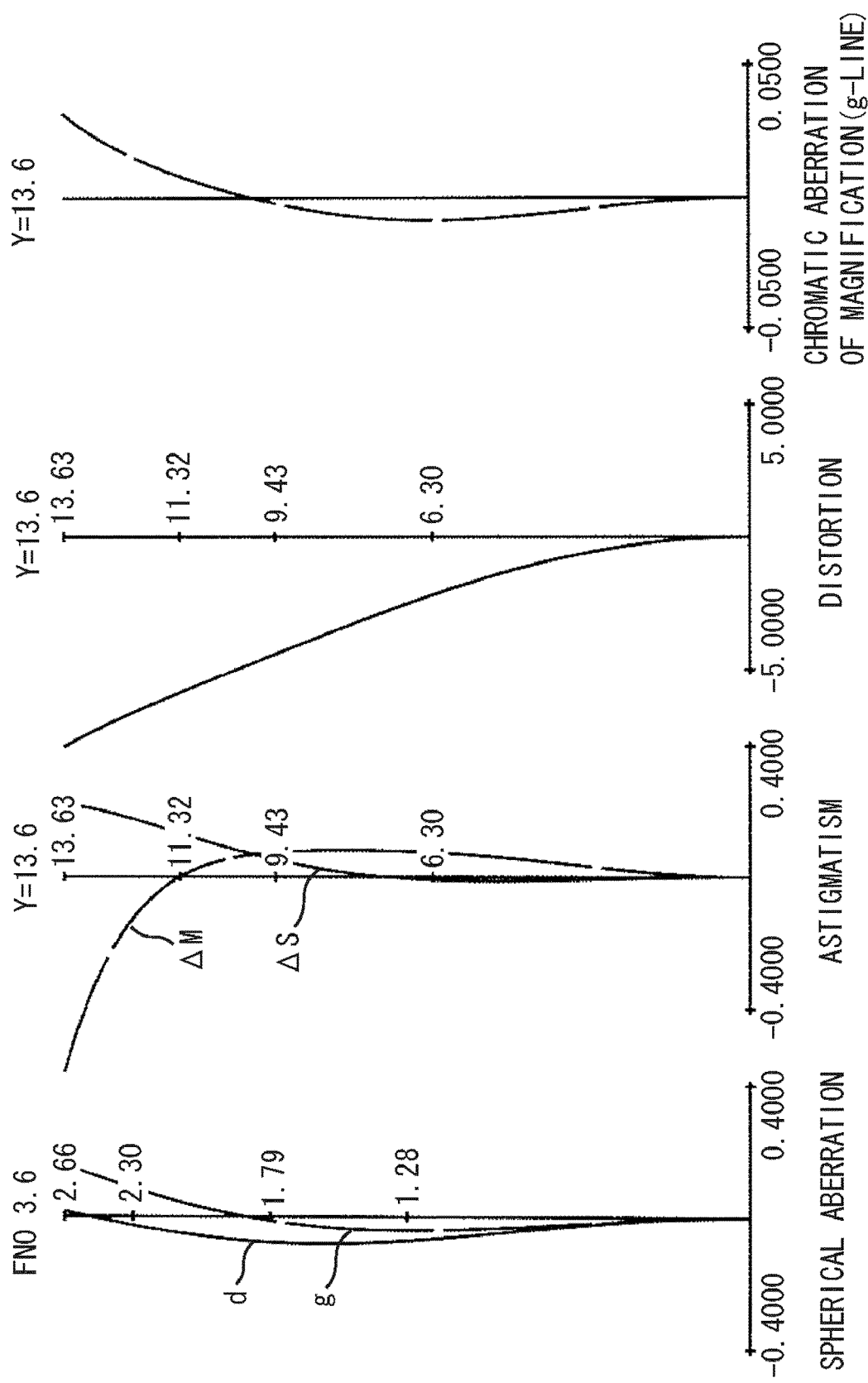

ZOOM LENS AND IMAGE PICKUP APPARATUS HAVING THE SAME

BACKGROUND OF THE INVENTION

1. Field of the Invention

The present invention relates to a zoom lens and an image pickup apparatus having the zoom lens. More specifically, the present invention relates to a zoom lens useful as a photographic (shooting) optical system of an image pickup apparatus, such as a digital camera, a video camera, a television camera, and a silver-halide film camera.

2. Description of the Related Art

In recent years, it is desired by the market that an image pickup apparatus that uses a solid-state image sensor, such as a video camera, a digital still camera, or a silver-halide film camera, has a large number of functions. Furthermore, it is desired by the market that the size of the entire apparatus is small at the same time and that a photographic optical system (zoom lens) used in such an image pickup apparatus has a wide angle of view, is small in total size, and the total weight thereof is light.

In an image pickup apparatus using a solid-state image sensor, various optical members, such as a low-pass filter and a color correction filter, are provided between a rearmost portion of the lens and the image sensor. In addition, in an image pickup apparatus, such as a single-lens reflex camera, a quick return mirror is provided between the last (rearmost) lens surface and the image sensor. Accordingly, it is desired that a photographic optical system used in the image pickup apparatus described above has a long back focus.

A conventional negative-lead type zoom lens, which is a zoom lens having a wide angle of view and a long back focus and whose entire size is small, includes a lens unit having a negative refractive power at a location closest to the object side. U.S. Pat. No. 6,081,389 and Japanese Patent Application Laid-Open No. 06-273670 each discuss a negative-lead type zoom lens composed of two lens units having, in order from the object side to the image side, negative and positive refractive powers.

Japanese Patent Application Laid-Open No. 2000-330024 and Japanese Patent Application Laid-Open No. 2003-177314 each discuss a negative-lead type zoom lens composed of three lens units having, in order from the object side to the image side, a first lens unit having a negative refractive power, a second lens unit having a positive refractive power, and a third lens unit having a negative refractive power.

In addition, Japanese Patent Application Laid-Open No. 2006-58584 and Japanese Patent Application Laid-Open No. 2001-42217 each discuss a negative-lead type zoom lens composed of four lens units having, in order from the object side to the image side, negative, positive, negative, and positive refractive powers.

The first lens unit of a negative-lead type zoom lens, may have a large effective diameter and a relatively heavy weight. In order to reduce the size and weight of the first lens unit, Japanese Patent Application Laid-Open No. 2002-072091, U.S. Pat. Nos. 6,992,835, 6,229,655, and Japanese Patent Application Laid-Open No. 2007-156043 each discuss a zoom lens including a small-size and lightweight first lens unit having negative, negative, and positive lenses appropriately made of a plastic lens material.

In particular, an aspheric lens made of a plastic material can be relatively easily manufactured and is relatively light in weight. Accordingly, if an aspheric lens made of a plastic material is used as a lens of the first lens unit, the size and weight of the first lens unit can be easily reduced.

However, if the refractive power arrangement and the lens shape are not appropriately set when an aspheric lens made of a plastic material is used as a lens of the first lens unit, it becomes difficult to achieve a high optical performance for the entire zooming range, reduce the size of the entire zoom lens system, and provide a wide angle of view.

SUMMARY OF THE INVENTION

According to an aspect of the present invention, a zoom lens includes, in order from an object side to an image side, a first lens unit having a negative refractive power and a second lens unit having a positive refractive power. In the zoom lens, an interval between the first and second lens units becomes smaller at a telephoto end than at a wide-angle end during zooming. The first lens unit includes, in order from the object side to the image side, a first lens having a negative refractive power, a second lens having a negative refractive power, which is made of a plastic and has an aspheric lens surface, and a third lens unit having a positive refractive power. A refractive index and an Abbe number of the plastic (Nd, vd), a focal length of the second lens (fn), and a focal length of the first lens unit (f1) satisfy the following conditions:

$$Nd - 2.03 + 0.008 \cdot vd < 0$$

$$Nd - 1.97 + 0.0083 \cdot vd > 0$$

$$1.55 < Nd < 1.65$$

$$0.5 < fn/f1 < 2.0.$$

According to an exemplary embodiment of the present invention, a small-size lightweight zoom lens having a wide angle of view, a long back focus, and a high optical performance in the entire zoom range can be implemented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention, together with the description, serve to explain the principles of the present invention.

FIG. 1 is a lens cross section of a zoom lens according to a first exemplary embodiment of the present invention at the wide-angle end.

FIG. 3 is a lens cross section of a zoom lens according to a second exemplary embodiment of the present invention at the wide-angle end.

FIGS. 4A and 4B are aberration charts of the zoom lens according to the second exemplary embodiment of the present invention.

FIGS. 8A and 8B are aberration charts of the zoom lens according to the fourth exemplary embodiment of the present invention.

FIG. 9 is a lens cross section of a zoom lens according to a fifth exemplary embodiment of the present invention at the wide-angle end.

FIGS. 10A and 10B are aberration charts of the zoom lens according to the fifth exemplary embodiment of the present invention.

DETAILED DESCRIPTION OF THE EMBODIMENTS

Figure 2A:
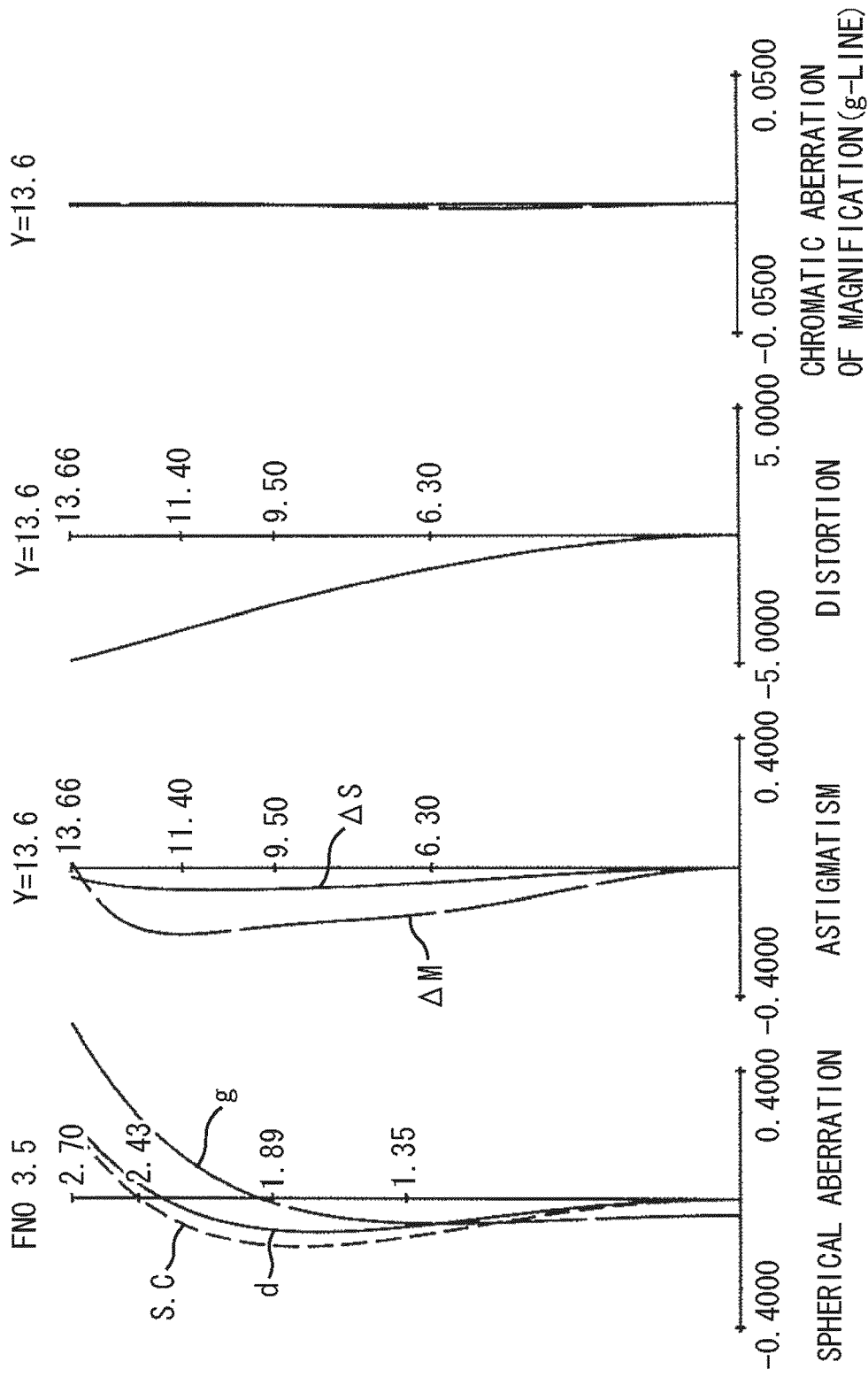
FIGS. 2A and 2B are aberration charts of the zoom lens according to the first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

A zoom lens according to an exemplary embodiment of the present invention includes, in order from the object side to the image side, a first lens unit having a negative refractive power and a second lens unit having a positive refractive power. During zooming, the interval between the first and the second lens units becomes smaller at the telephoto end than at the wide-angle end.

The first lens unit includes, in order from the object side to the image side, a first lens having a negative refractive power, a second lens having a negative refractive power, which is made of a plastic and has an aspheric lens surface, and a third lens having a positive refractive power.

Figure 2B:
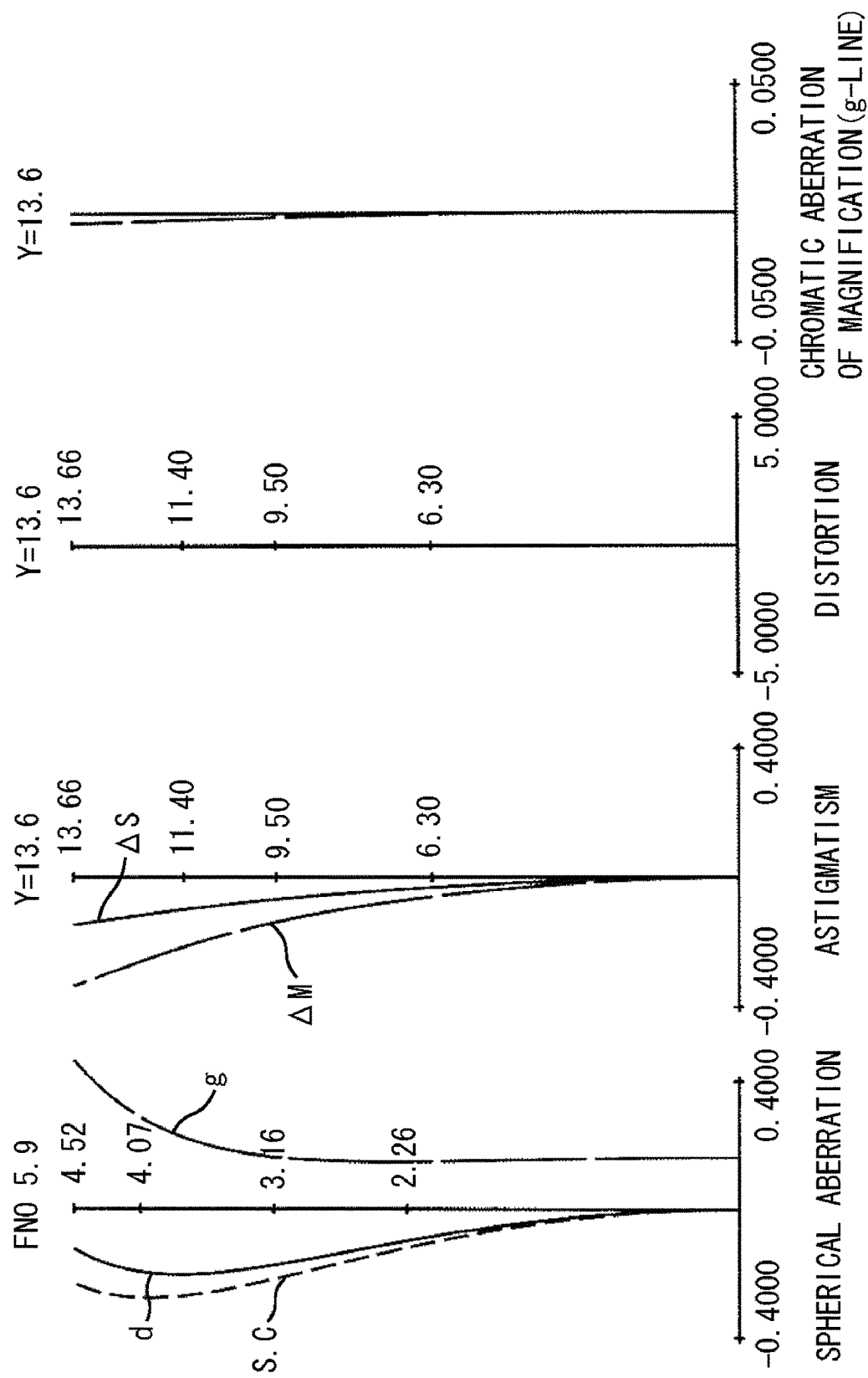

FIG. 1 is a lens cross section of a zoom lens according to a first exemplary embodiment of the present invention at a wide-angle end (short focal length end). FIGS. 2A and 2B are aberration charts of the zoom lens according to the first exemplary embodiment at the wide-angle end and at a telephoto end (long focal length end), respectively, during focusing on an infinitely-distant object.

FIG. 3 is a lens cross section of a zoom lens according to a second exemplary embodiment of the present invention at the wide-angle end. FIGS. 4A and 4B are aberration charts of the zoom lens according to the second exemplary embodiment at the wide-angle end and at the telephoto end, respectively, during focusing on an infinitely-distant object.

Figure 5:
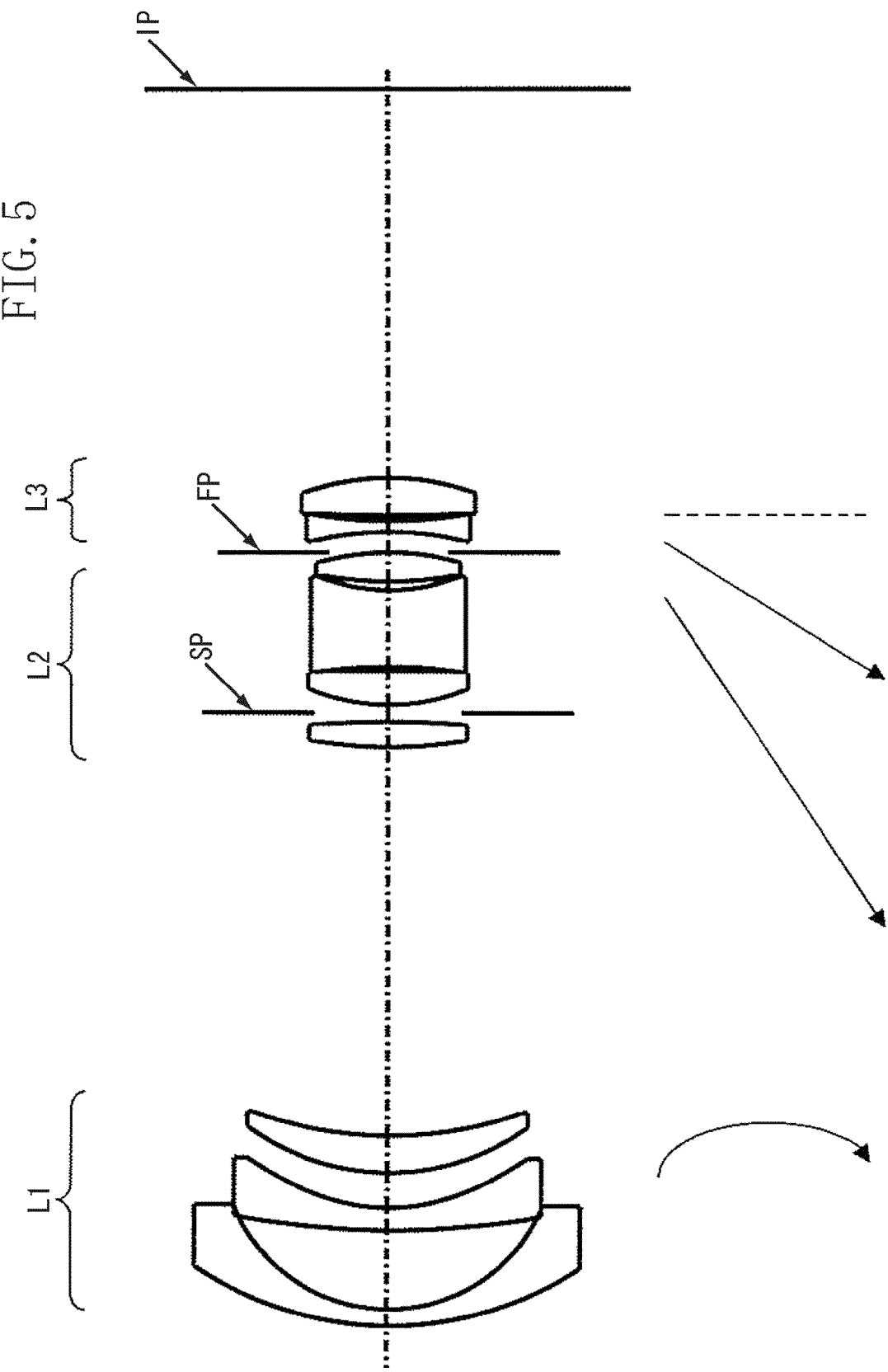
FIG. 5 is a lens cross section of a zoom lens according to a third exemplary embodiment of the present invention at the wide-angle end.
Figure 6A:
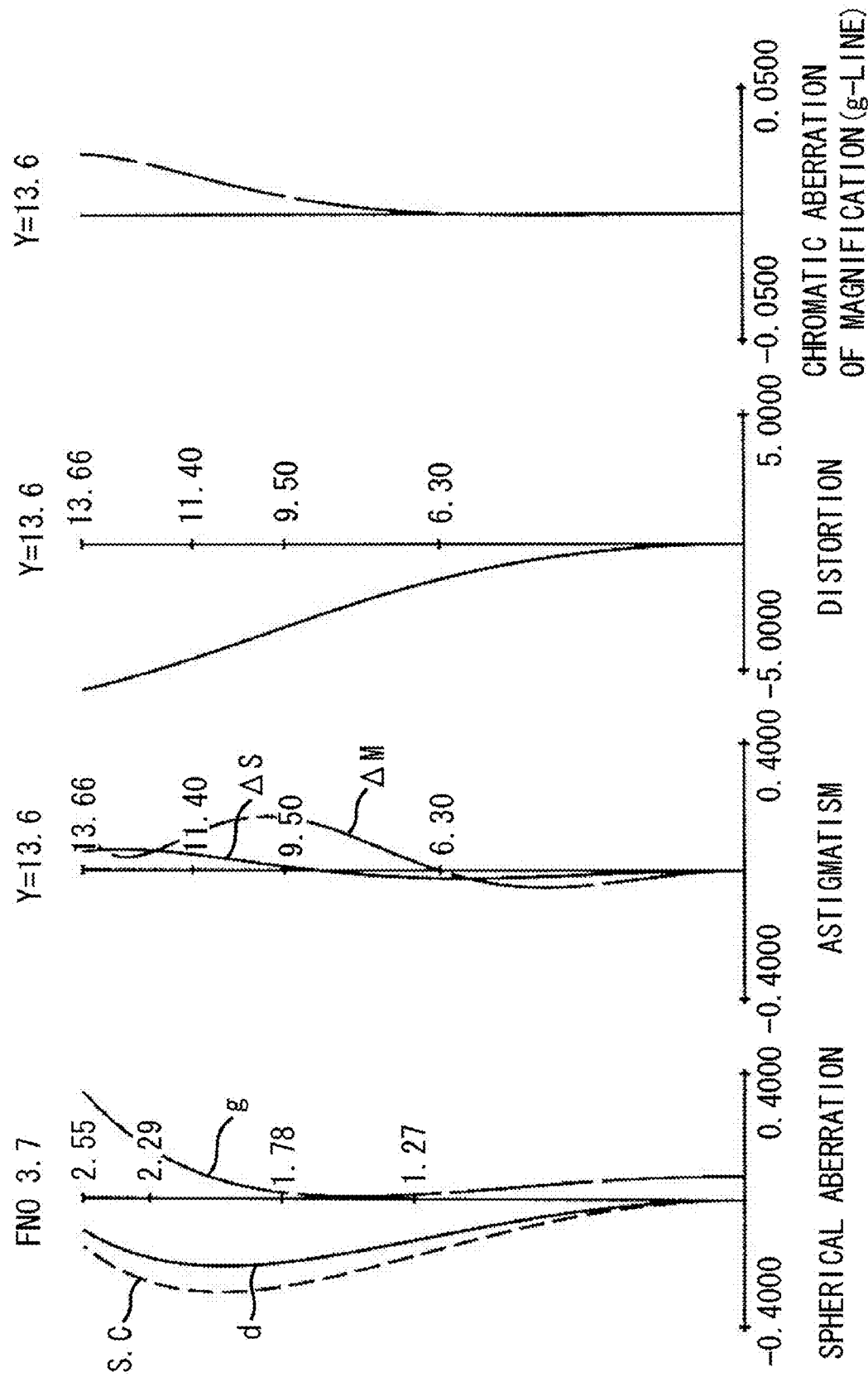
FIGS. 6A and 6B are aberration charts of the zoom lens according to the third exemplary embodiment of the present invention.
Figure 6B:
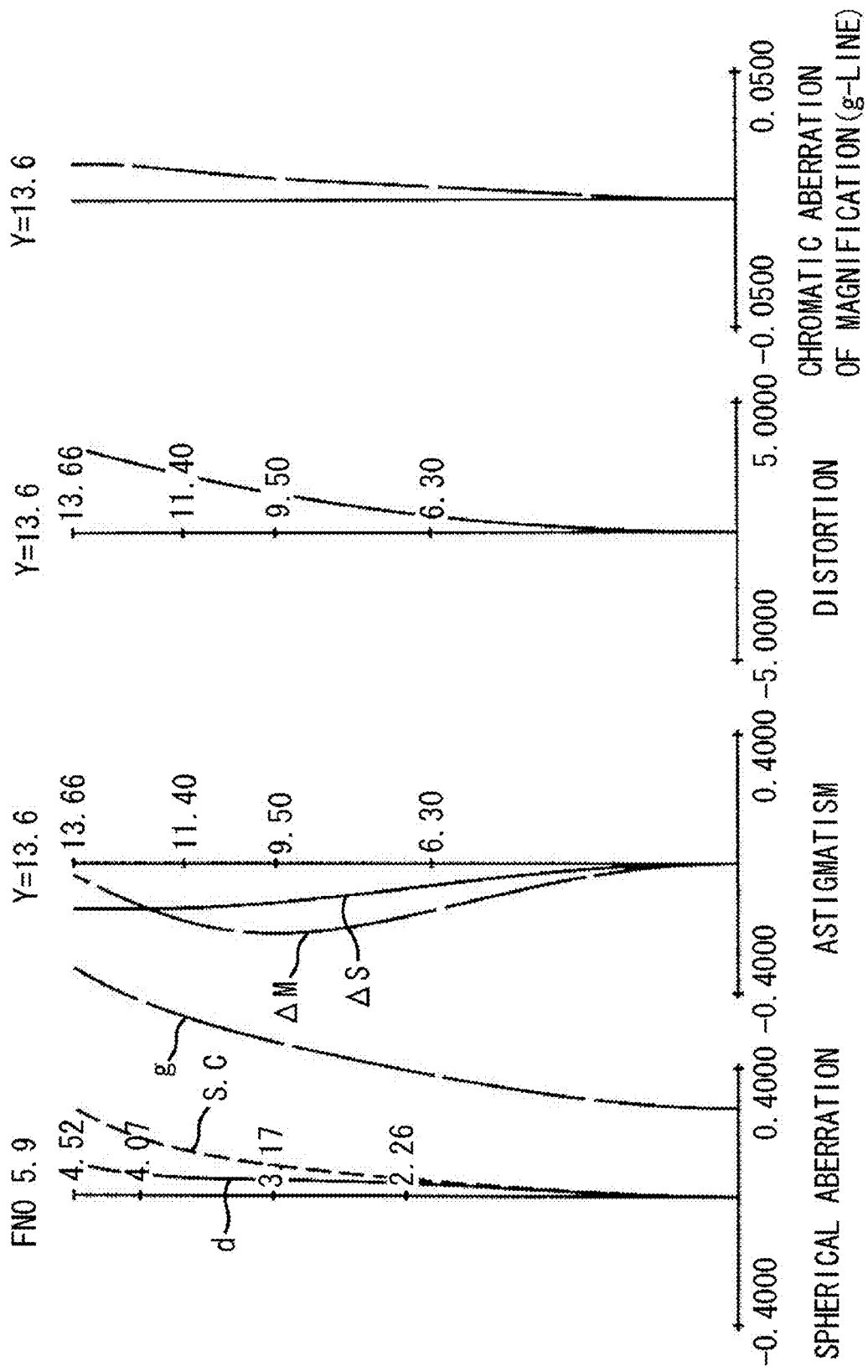

FIG. 5 is a lens cross section of a zoom lens according to a third exemplary embodiment of the present invention at the wide-angle end. FIGS. 6A and 6B are aberration charts of the zoom lens according to the third exemplary embodiment at the wide-angle end and at the telephoto end, respectively, during focusing on an infinitely-distant object.

Figure 7:
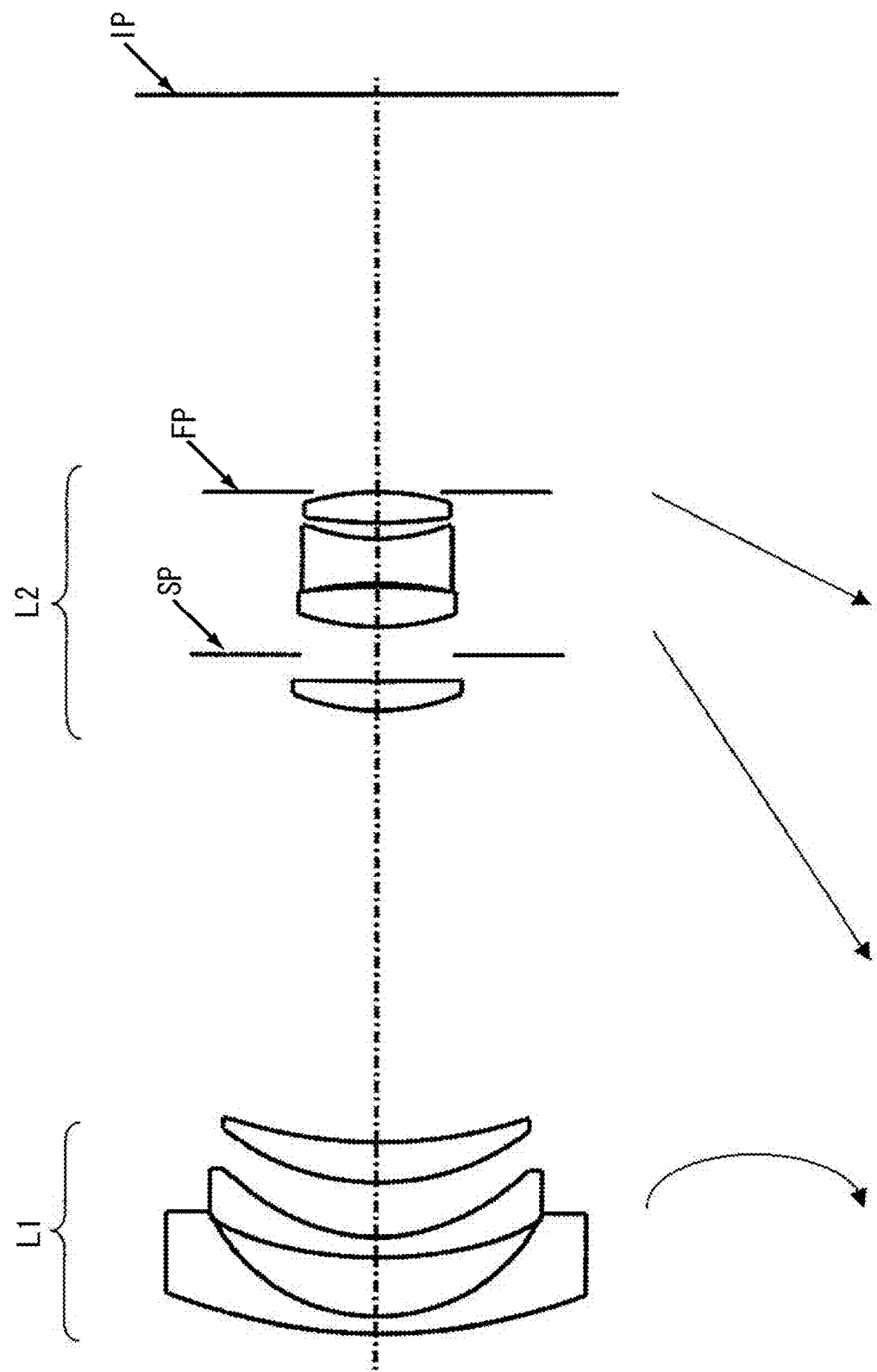
FIG. 7 is a lens cross section of a zoom lens according to a fourth exemplary embodiment of the present invention at the wide-angle end.
Figure 8A:
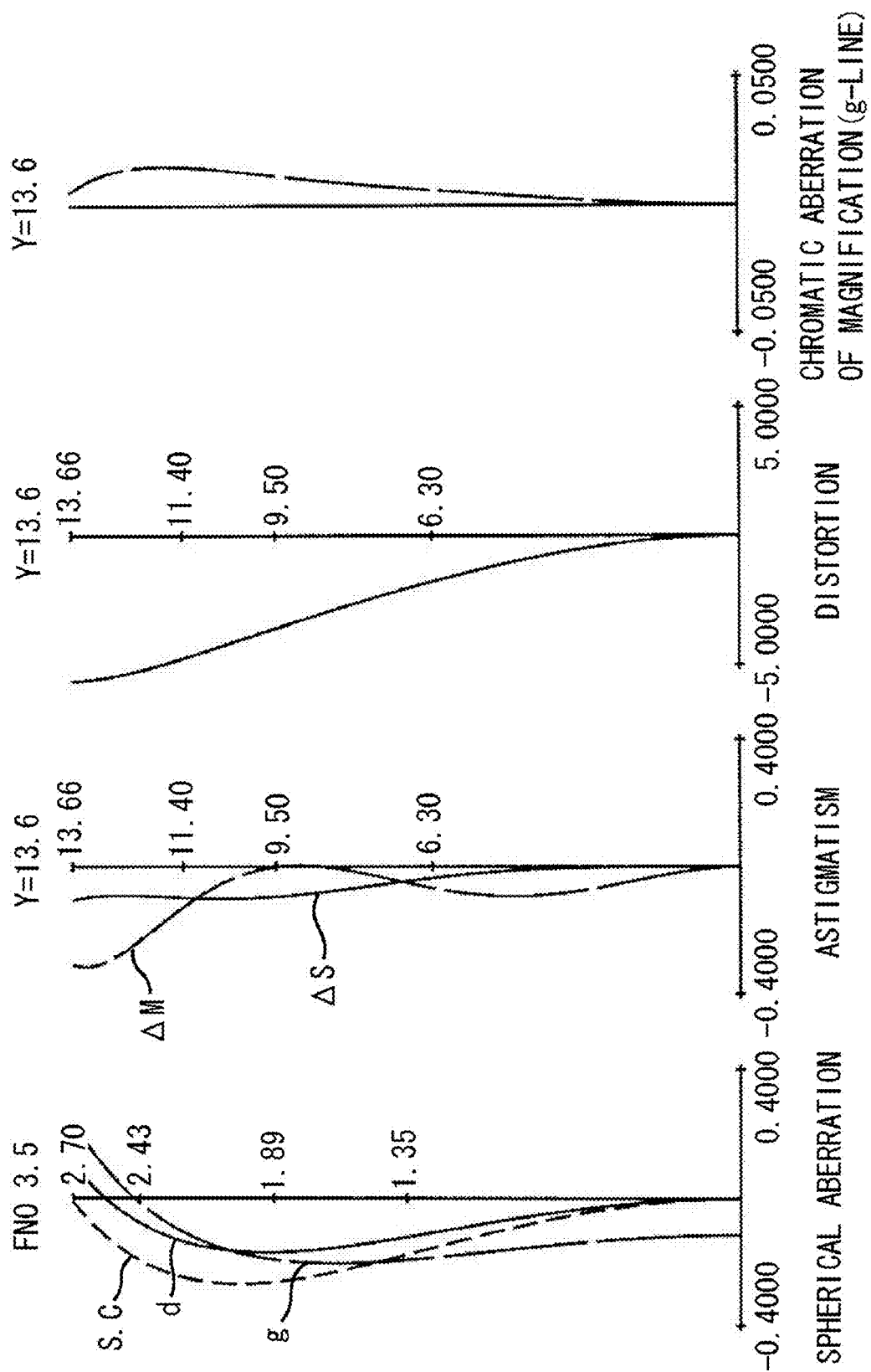

FIG. 7 is a lens cross section of a zoom lens according to a fourth exemplary embodiment of the present invention at the wide-angle end. FIGS. 8A and 8B are aberration charts of the zoom lens according to the fourth exemplary embodiment at the wide-angle end and at the telephoto end, respectively, during focusing on an infinitely-distant object.

Figure 10B:
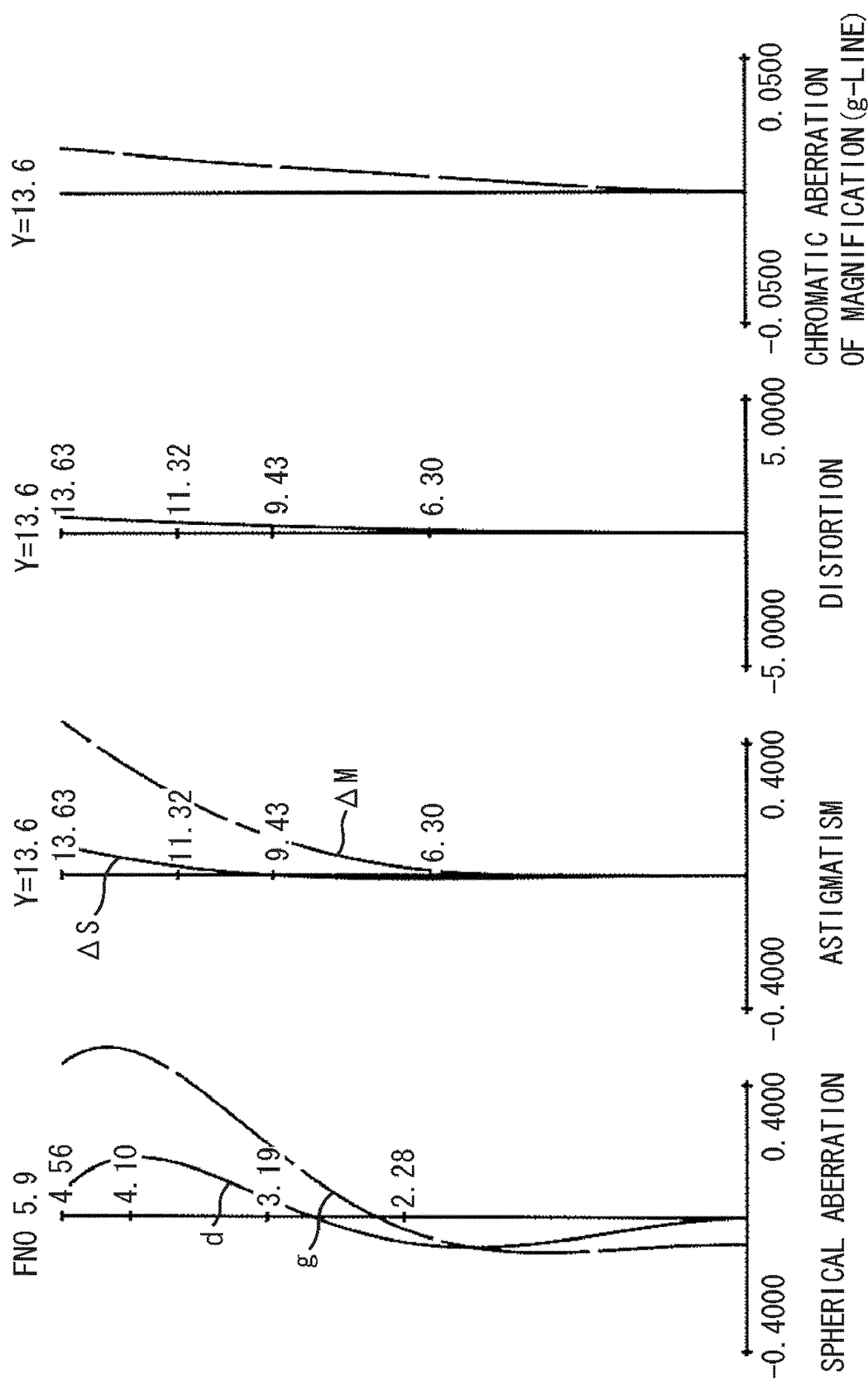

FIG. 9 is a lens cross section of a zoom lens according to a fifth exemplary embodiment of the present invention at the wide-angle end. FIGS. 10A and 10B are aberration charts of the zoom lens according to the fifth exemplary embodiment at the wide-angle end and at the telephoto end, respectively, during focusing on an infinitely-distant object.

Figure 11:
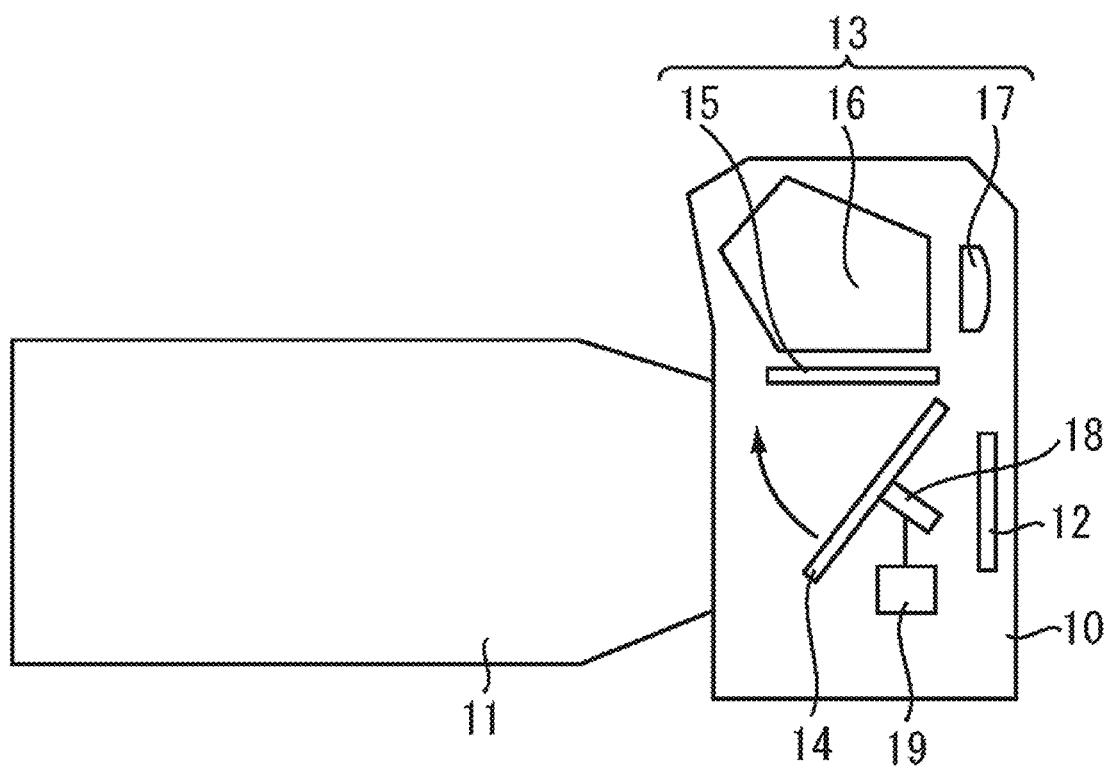
FIG. 11 illustrates main components of an exemplary image pickup apparatus according to an exemplary embodiment of the present invention.

FIG. 11 illustrates main components of an example of a single-lens reflex camera (image pickup apparatus) according to an exemplary embodiment of the present invention.

The zoom lens according to each exemplary embodiment is a photographic lens system (optical system) used in an image pickup apparatus, such as a video camera, a digital camera, or a silver-halide film camera. In each of the diagrams showing a cross section of the zoom lens (FIGS. 1, 3, 5, 7, and 9), an object side (front side) is shown at the left-hand portion of the figure, and an image side (rear side) is shown at the right-hand portion thereof.

If the zoom lens according to each exemplary embodiment of the present invention is used as a projection lens for a projector, in each of the diagrams showing a cross section of the zoom lens (FIGS. 1, 3, 5, 7, and 9), the side of a screen is shown at the left-hand portion of the figure, and the side of an image to be projected is shown at the right-hand portion thereof.

In each of the diagrams showing a cross section of a zoom lens (FIGS. 1, 3, 5, 7, and 9), "i" denotes the order of a lens unit from the object side and "Li" denotes the i-th lens unit. "SP" denotes an aperture stop (full F-number stop). "FP" denotes a flare cutting stop. "IP" denotes an image plane. The image plane IP is, when the zoom lens according to an exemplary embodiment of the present invention is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the optical system is used as a photographic optical system of a silver-halide film camera, equivalent to a film (photosensitive) surface. Each arrow indicates the direction of movement of each lens unit during zooming from the wide-angle end to the telephoto end.

In each of the aberration charts (FIGS. 2A and 2B, 4A and 4B, 6A and 6B, 8A and 8B, and 10A and 10B), "d" and "g" respectively denote d-line and g-line light. "S.C" denotes a sine condition. "$\Delta M$" and "$\Delta S$" respectively denote a meridional image plane and a sagittal image plane. Chromatic aberration of magnification is represented with g-line light. "FNO" denotes an F-number, and "Y" denotes an image height.

In each of the following exemplary embodiments, each of the wide-angle end and the telephoto end refers to a zooming position when a lens unit for varying magnification is positioned at each of the ends of a range in which the magnification varying lens unit can mechanically move along an optical axis.

In each of the lens cross sections of the first, the second, and the fourth exemplary embodiments of the present invention (FIGS. 1, 3, and 7), the first lens unit L1 has a negative refractive power (optical power=the reciprocal of the focal length) and the second lens unit L2 has a positive refractive power.

In the zoom lens according to each of the first, the second, and the fourth exemplary embodiments, the first lens unit L1 substantially reciprocatingly moves along a locus convex towards the image side during zooming from the wide-angle end to the telephoto end. The second lens unit L2 moves towards the object side during zooming from the wide-angle end to the telephoto end.

More specifically, in each of the first, the second, and the fourth exemplary embodiments, each of the lens units L1 and L2 moves so that an interval between the lens units L1 and L2 becomes smaller at the telephoto end than at the wide-angle end.

In the zoom lens according to each of the first, the second, and the fourth exemplary embodiments, variation of magnification is mainly performed by moving the second lens unit L2. In addition, the first lens unit L1 reciprocatingly moves to compensate for movement (variation) of an image plane caused by the variation of magnification.

The aperture stop SP moves integrally with the second lens unit L2 during zooming. The flare cutting stop FP independently moves towards the object side. Furthermore, the second lens unit L2 includes, in order from the object side to the image side, a positive lens, a positive lens, a negative lens, and a positive lens.

In the third exemplary embodiment illustrated in FIG. 5, the first lens unit L1 has a negative refractive power. The second lens unit L2 has a positive refractive power, and the third lens unit L3 has a negative refractive power.

In the third exemplary embodiment (FIG. 5), during zooming from the wide-angle end to the telephoto end, the first lens unit L1 moves along a locus convex towards the image side. The second lens unit L2 moves towards the object side during zooming from the wide-angle end to the telephoto end. The third lens unit L3 is stationary during zooming.

In the third exemplary embodiment, each of the lens units L1 through L3 moves so that an interval between the lens units L1 and L2 becomes smaller at the telephoto end than at the wide-angle end.

In the zoom lens according to the third exemplary embodiment, variation of magnification is mainly performed by moving the second lens unit L2. In addition, the first lens unit L1 reciprocatingly moves to compensate for movement (variation) of an image plane caused by the variation of magnification.

The aperture stop SP moves integrally with the second lens unit L2 during zooming. The flare cutting stop FP independently moves towards the object side. Furthermore, the second lens unit L2 includes, in order from the object side to the image side, a positive lens, a positive lens, a negative lens, and a positive lens. The third lens unit L3 includes, in order from the object side to the image side, a negative lens and a positive lens.

In the fifth exemplary embodiment illustrated in FIG. 9, the first lens unit L1 has a negative refractive power and the second lens unit L2 has a positive refractive power. The third lens unit L3 has a negative refractive power and the fourth lens unit L4 has a positive refractive power.

In the third exemplary embodiment (FIG. 9), during zooming from the wide-angle end to the telephoto end, each of the first thorough the fourth lens units L1 through L4 moves along an optical axis in the manner indicated by each corresponding arrow in FIG. 9 so that an interval between the lens units L1 through L4 can vary.

More specifically, the interval between the lens units L1 through L4 can vary in the following manner. The air space between the first lens unit L1 and the second lens unit L2 decreases, the air space between the second lens unit L2 and the third lens unit L3 increases, and the air space between the third lens unit L3 and the fourth lens unit L4 decreases.

The first lens unit L1 moves along a locus convex towards the image side. Each of the second through the fourth lens units L2 through L4 moves towards the object side. During zooming, the aperture stop SP moves integrally with the second lens unit L2.

The second lens unit L2 includes a positive lens and a cemented lens, which is composed of a negative lens and a positive lens. The third lens unit L3 includes a cemented lens, which is composed of a negative lens and a positive lens. The fourth lens unit L4 includes a negative lens and a positive lens.

In each exemplary embodiment, a converter lens and an afocal lens unit can be removably provided on at least either one of the object side of the lens unit located closest to the object side and the image side of the lens unit located closest to the image side.

The zoom lens according to each exemplary embodiment includes, in order from the object side to the image side, a first lens unit L1 having a negative refractive power and a second lens unit L2 having a positive refractive power. With the above-described configuration, each exemplary embodiment can achieve a zoom lens having a sufficiently long back focus and a wide angle of view.

In addition, in each exemplary embodiment, the first lens unit L1 and the second lens unit L2 independently move during zooming. Thus, the zoom lens according to each exemplary embodiment can suppress or at least reduce various aberrations that may occur during zooming.

Furthermore, in each exemplary embodiment, the first lens unit L1 non-linearly moves during zooming. Thus, the zoom lens according to each exemplary embodiment can effectively compensate for movement (variation) of an image plane caused by the variation of magnification.

The first lens unit L1 in the zoom lens according to each exemplary embodiment includes, in order from the object side to the image side, a first lens having a negative refractive power, a second lens having a negative refractive power, and a third lens having a positive refractive power. The second lens unit L2 includes an aspheric lens which is made of a plastic and has an aspheric surface.

A refractive index and an Abbe number of the plastic (Nd, vd), a focal length of the second lens (fn), and a focal length of the first lens unit L1 (f1) satisfy the following conditions:

$$Nd-2.03+0.008 \cdot vd<0 \quad (1)$$

$$Nd-1.97+0.0083 \cdot vd>0 \quad (2)$$

$$1.55<Nd<1.65 \quad (3)$$

$$0.5<fn/f1<2.0 \quad (4).$$

In a negative-lead type zoom lens, the effective diameter of a lens of a first lens unit L1 is generally greater than that of the other lens units. Accordingly, the ratio of the weight of the first lens unit L1 to the total weight of the zoom lens system is great.

In order to achieve a small-size lightweight zoom lens system that can capture a high quality image, it is significant to provide an appropriate configuration to the first lens unit L1 and use an appropriate lens material of each lens constituting the first lens unit L1.

The hardness of plastic is lower than that of normal glass. Accordingly, it is not useful to provide a lens made of plastic at a location closest to the object side. On the other hand, in order to effectively correct off-axis aberration that may occur in the first lens unit L1, it is useful to provide an aspheric lens at a location as close to the object side as possible.

Accordingly, each exemplary embodiment uses a lens made of plastic and having an aspheric surface as the second lens of the first lens unit L1. In addition, each exemplary embodiment uses a lens made of glass as the first and the third lenses.

For the plastic used as the material of the second lens of the first lens unit L1, a compound material for optical use, which is excellent in linear expansion coefficient, water absorption rate, and temperature dependency of refractive index, is used. More specifically, a compound material discussed in Japanese Patent Application Laid-Open No. 2007-126636 is useful, for example.

Each exemplary embodiment, which satisfies the above-described conditions (1) through (4), can achieve a high optical performance of a small-sized lightweight first lens unit having a high optical performance.

Now, a technical significance of each condition will be described below. The conditions (1) and (2) each provide a condition for the plastic material of the second lens. More specifically, the condition (1) provides a condition for the relationship between the Abbe number and the refractive index. If the upper limit of the condition (1) is exceeded, then the specific gravity of the material becomes great. In this case, the second lens may become heavy.

The condition (2) provides a condition for the relationship between the Abbe number and the refractive index. If the lower limit of the condition (2) is exceeded, then the Petzval sum may increase in the negative direction. In this case, the characteristic of the image plane may degrade.

The condition (3) provides a condition for the refractive index of the material of the second lens. More specifically, the condition (3) provides a condition for a refractive index value for effectively reducing the weight of the first lens unit L1 and increasing the optical performance thereof.

If the refractive index of the plastic becomes too low exceeding the lower limit value of the condition (3), then the Petzval sum may increase in the negative direction. In this case, the characteristic of the image plane may degrade.

On the other hand, if the refractive index of the plastic becomes too high exceeding the upper limit value of the condition (3), then the specific gravity of the plastic may increase. In this case, the weight of the second lens may become heavy.

The condition (4) provides a condition for the ratio of the focal length of the second lens, which is made of plastic and having an aspheric surface, to that of the first lens unit L1. More specifically, the condition (4) primarily provides a condition for effectively reducing the size of the first lens unit L1 and increasing the optical performance thereof.

If the refractive power of the second lens becomes too high exceeding the lower limit of the condition (4), then the Petzval sum may increase in the negative direction. In this case, the characteristic of the image plane may degrade. In addition, in this case, the refractive power of the first lens having a negative refractive power, which is located closest to the object side, may become too low. Accordingly, it may become necessary to use a lens having a large diameter for the first lens.

On the other hand, if the refractive power of the second lens becomes too low exceeding the upper limit value of the condition (4), then the refractive power of the first lens of the first lens unit L1, which has a negative refractive power and is located closest to the object side, may become too high to effectively correct distortion and coma.

In each exemplary embodiment, the range of the values in the conditions (1) through (4) can be altered as follows:

$$Nd-2.03+0.008 \cdot vd < -0.01 \tag{1a}$$

$$Nd-1.97+0.0083 \cdot vd > 0.1 \tag{2a}$$

$$1.55 < Nd < 1.63 \tag{3a}$$

$$0.8 < fn/f1 < 1.7 \tag{4a}.$$

In each exemplary embodiment, each lens unit is provided with appropriately arranged refractive powers in the above-described manner. In particular, in each exemplary embodiment, the lens configuration of and the arrangement of refractive powers within the first lens unit L1 are appropriately set.

As described above, each exemplary embodiment implements a small-size lightweight zoom lens having a back focus sufficiently long compared with the focal length of the entire zoom lens system and having a high optical performance.

With the above-described configuration, each exemplary embodiment can achieve a zoom lens having a high optical performance and a wide angle of view.

It is further useful if each exemplary embodiment satisfies at least one of the following conditions to achieve an effect of each corresponding condition.

Radii of curvature of the lens surfaces of the second lens on the object side and the image side (Rp1, Rp2), each radius of curvature of the aspheric surface being a paraxial radius of curvature, a focal length of the second lens unit L2 (f2), a focal length of the entire zoom lens at the wide-angle end (fw), an average refractive index of materials of the first lens and the second lens (Nn), and a refractive index of a material of the third lens (Np) can satisfy at least one of the following conditions:

$$0.2 < (Rp1-Rp2)/(Rp1+Rp2) < 3.0 \tag{5}$$

$$0.4 < |fw/f1| < 1.0 \tag{6}$$

$$0.4 < fw/f2 < 1.1 \tag{7}$$

$$0.06 < Np-Nn < 0.25 \tag{8}.$$

Now, a technical significance of each of the conditions (5) through (8) will be described below.

The condition (5) provides a condition for the radii of curvature of the surfaces of the second lens on the object side and the image side. More specifically, the condition (5) primarily provides a condition for the shape of the second lens for achieving a high optical performance and easy lens manufacture.

If the lower limit of the condition (5) is exceeded, then the lens surface on the object side has a convex shape towards the object side. More specifically, the level of the meniscus shape of the lens may become very high. In this case, it may become difficult to form the aspheric shape of the lens even when a plastic material is used.

On the other hand, if the upper limit of the condition (5) is exceeded, then the degree of the convex shape of the lens surface on the object side may become too high to effectively correct distortion and coma that may occur at the wide-angle end in particular.

The condition (6) provides a condition for the ratio of the focal length of the entire zoom lens at the wide-angle end to that of the first lens unit L1. More specifically, the condition (6) provides a condition for effectively correcting distortion while easily reducing the dimension of the entire zoom lens.

If the refractive power of the first lens unit L1 becomes too low exceeding the lower limit of the condition (6), then the lens diameter of the first lens unit L1, which is the largest of all the lens diameters of the other lens units, may increase.

On the other hand, if the refractive power of the first lens unit L1 becomes too high exceeding the upper limit of the condition (6), then the amount of negative distortion that may occur in the first lens unit L1 may become too large to correct distortion.

The condition (7) provides a condition for the ratio of the focal length of the entire zoom lens at the wide-angle end to that of the second lens unit L2. More specifically, the condition (7) provides a condition for increasing the optical performance of the second lens unit L2 while easily reducing the dimension of the entire zoom lens.

If the refractive power of the second lens unit L2 becomes too low exceeding the lower limit of the condition (7), then the amount of movement of the second lens unit L2 during zooming may increase. In addition, it may become difficult to achieve a sufficiently long back focus.

On the other hand, if the refractive power of the second lens unit L2 becomes too high exceeding the upper limit of the condition (7), then spherical aberration, in particular, may become undercorrected at the telephoto end.

The condition (8) provides a condition for the difference between an average refractive index of the materials of the first lens having a negative refractive power and the second lens having a negative refractive power of the first lens unit L1 and the refractive index of the material of the third lens having a positive refractive power. More specifically, the condition (8) provides a condition for effectively correcting variation of the image plane and chromatic aberration of magnification.

If the lower limit of the condition (8) is exceeded, then the refractive index of the third lens having a positive refractive power may become low. More specifically, in this case, if an ordinary glass material is used, the level of dispersion of the material may become too low to easily correct chromatic aberration of magnification, in particular, at the wide-angle end.

On the other hand, if the refractive indices of the materials of the first lens having a negative refractive power and the second lens having a negative refractive power become too low exceeding the upper limit value of the condition (8), then the Petzval sum may greatly increase in the negative direction. In this case, overcorrection on the image plane may occur.

It is further useful if the range of the values in the conditions (5) through (8) are altered as follows:

$$0.3 < (Rp1 + Rp2)/(Rp1 + Rp2) < 2.0 \quad (5a)$$

$$0.50 < |fw/f1| < 0.85 \quad (6a)$$

$$0.55 < fw/f2 < 0.90 \quad (7a)$$

$$0.08 < Np + Nn < 0.22 \quad (8a).$$

In each exemplary embodiment, it is also useful if the first lens unit L1 moves along the optical axis to effect focusing. The focusing from an infinitely-distant object to a closest object is executed by moving the first lens unit L1 along the optical axis towards the object side.

In each exemplary embodiment, by executing focusing by moving the first lens unit L1, the configuration of the focusing mechanism can be as simple as possible. In addition, each exemplary embodiment uses plastic, whose specific gravity is lower than that of glass, as the material of the second lens of the first lens unit L1 having a negative refractive power in order to reduce the weight of the first lens unit L1. Thus, each exemplary embodiment reduces the load on a motor (not illustrated) that drives the first lens unit L1 to move during focusing.

It is useful to form and provide, on at least one surface of the second lens, a fine rugged structural member which has an antireflection function and has an average pitch of a specific wavelength (e.g., 400 nm or less for visible light). For the fine rugged structural member, a method discussed in Japanese Patent Application Laid-Open No. 09-202649 or Japanese Patent Application Laid-Open No. 2006-010831 can be used.

It is necessary to provide coating (a thin film) on the lens to prevent image degradation such as lens flare or ghost image. If the coat for the lens is made of a plastic material, the environmental resistance of the lens coat is lower than that of a lens coat made of glass. Furthermore, a plastic lens coat is not easy to manufacture.

Accordingly, it is useful to provide a fine rugged structural member on the lens to provide the lens with a coat having a high environmental resistance and a high reflection prevention characteristic at the same time.

In each exemplary embodiment, the first lens unit L1 includes three lenses, namely, the first lens having a negative refractive power, the second lens having a negative refractive power, which is made of a plastic material, and the third lens having a positive refractive power.

In manufacturing a lens having a fine periodic structure thereon, it is prohibited for the operator to touch the lens surface. According to each exemplary embodiment, the lens surfaces of the second lens, which is made of a plastic material, can remain untouched after assembling the first lens unit L1 during mass production thereof. Furthermore, the enclosed configuration of the zoom lens system according to each exemplary embodiment can prevent entry of any dust.

Each exemplary embodiment of the present invention described above is not limited to the above-described configuration. More specifically, each exemplary embodiment of the present invention can be altered or modified within the scope of the present invention.

Numerical examples 1 through 5, which respectively correspond to the first through fifth exemplary embodiments of the present invention, are set forth below. In each of the numerical examples 1 through 5, "i" denotes the order of a surface from the object side, "Ri" denotes a radius of curvature of the i-th optical surface (the i-th surface), "Di" denotes a thickness of the optical member or an air interval between the i-th surface and the (i+1)-th surface, "Ni" and "vi" respectively denote a refractive index and an Abbe number of the i-th optical material with respect to d-line light.

In addition, each of "A", "B", "C", "D", "E", and "F" denotes an aspheric coefficient. The aspheric shape is expressed as $$X = (1/R)H^2)/[1 + \{1-(H/R)^2\}^{1/2}] + AH^2 + BH^4 + CH^6 + DH^8 + EH^{10} + FH^{12}$$

where "X" denotes a displacement from a surface vertex along the optical axis in a position at a height "H" from the optical axis, and "R" denotes a paraxial radius of curvature. Furthermore, "e-X" denotes "x10$^{-x}$". In addition, "f" denotes a focal length, "Fno" denotes an F-number, and "ω" denotes a half angle of view. The relationship between each condition described above and each numerical example is set forth in Table 1.

Numerical Example 1 f = 18.72-32.67-53.14  Fno = 3.47-4.44-5.88
2ω = 72.2-45.4-28.8

| | | | |
|---|---|---|---|
| R1 = 33.339 | D1 = 1.50 | N1 = 1.622992 | ν1 = 58.2 |
| R2 = 16.771 | D2 = 6.42 | | |
| R3 = 114.339 | D3 = 2.10 | N2 = 1.620000 | ν2 = 48.0 |
| *R4 = 15.296 | D4 = 5.49 | | |
| R5 = 23.448 | D5 = 3.20 | N3 = 1.728250 | ν3 = 28.5 |
| R6 = 55.585 | D6 = Variable | | |
| R7 = 27.384 | D7 = 2.30 | N4 = 1.570989 | ν4 = 50.8 |
| R8 = −550.424 | D8 = 1.09 | | |
| R9 = Stop | D9 = 2.50 | | |
| R10 = 21.586 | D10 = 3.60 | N5 = 1.570989 | ν5 = 50.8 |
| R11 = −48.319 | D11 = 0.27 | | |
| R12 = −32.365 | D12 = 8.46 | N6 = 1.740769 | ν6 = 27.8 |
| R13 = 18.054 | D13 = 0.74 | | |
| R14 = 58.094 | D14 = 2.70 | N7 = 1.581439 | ν7 = 40.8 |
| R15 = −23.519 | D15 = Variable | | |
| R16 = ∞ | | | |

Various Data

| Focal Length | | 18.72 | 32.67 | 53.14 |
|---|---|---|---|---|
| Variable Space | D6 | 35.51 | 13.16 | 1.60 |
| | D15 | 0.00 | 5.35 | 13.20 |

Aspheric Coefficients

R4:  A = 0.00000e+00    B = −2.30054e−05    C = −1.07741e−07
     D = 1.85961e−10    E = −2.83514e−12    F = 0.00000e+00

Focal Length of Each Lens Unit

| L1 | −32.57 |
|---|---|
| L2 | −31.05 |

Numerical Example 2 f = 18.65-32.71-53.36  Fno = 3.49-4.44-5.88
2ω = 72.4-45.3-28.7

| | | | |
|---|---|---|---|
| R1 = 34.860 | D1 = 1.50 | N1 = 1.696797 | ν1 = 55.5 |
| R2 = 17.340 | D2 = 6.52 | | |
| R3 = 90.507 | D3 = 1.20 | N2 = 1.580000 | ν2 = 49.0 |
| *R4 = 15.693 | D4 = 5.60 | | |
| R5 = 23.402 | D5 = 3.20 | N3 = 1.755199 | ν3 = 27.5 |
| R6 = 46.615 | D6 = Variable | | |
| R7 = 26.177 | D7 = 2.30 | N4 = 1.570989 | ν4 = 50.8 |
| R8 = 1173.627 | D8 = 1.09 | | |
| R9 = Stop | D9 = 2.50 | | |
| R10 = 22.003 | D10 = 3.60 | N5 = 1.570989 | ν5 = 50.8 |
| R11 = −50.055 | D11 = 0.27 | | |
| R12 = −33.363 | D12 = 8.46 | N6 = 1.740769 | ν6 = 27.8 |
| R13 = 17.878 | D13 = 0.68 | | |
| R14 = 43.918 | D14 = 2.70 | N7 = 1.581439 | ν7 = 40.8 |
| R15 = −25.006 | D15 = Variable | | |
| R16 = ∞ | | | |

Various Data

| Focal Length | | 18.65 | 32.71 | 53.36 |
|---|---|---|---|---|
| Variable Space | D6 | 35.92 | 12.97 | 1.20 |
| | D15 | 0.00 | 5.35 | 13.20 |

Aspheric Coefficients

R4:  A = 0.00000e+00    B = −2.00487e−05    C = −8.64259e−08
     D = 1.23905e−10    E = −2.38767e−12    F = 0.00000e+00

-continued

Numerical Example 2

Focal Length of Each Lens Unit

| L1 | −32.11 |
|---|---|
| L2 | −31.00 |

Numerical Example 3 f = 18.60-32.61-53.18  Fno = 3.65-4.54-5.88
2ω = 72.6-45.5-28.8

| | | | |
|---|---|---|---|
| R1 = 30.689 | D1 = 1.50 | N1 = 1.712995 | ν1 = 53.9 |
| R2 = 14.816 | D2 = 7.04 | | |
| *R3 = 65.774 | D3 = 2.00 | N2 = 1.600000 | ν2 = 48.0 |
| *R4 = 16.529 | D4 = 3.19 | | |
| R5 = 20.857 | D5 = 3.30 | N3 = 1.846660 | ν3 = 23.9 |
| R6 = 34.676 | D6 = Variable | | |
| R7 = 38.803 | D7 = 2.30 | N4 = 1.517417 | ν4 = 52.4 |
| R8 = −76.071 | D8 = 0.80 | | |
| R9 = Stop | D9 = 0.69 | | |
| R10 = 17.832 | D10 = 3.00 | N5 = 1.571351 | ν5 = 53.0 |
| R11 = −235.971 | D11 = 0.42 | | |
| R12 = −43.579 | D12 = 6.95 | N6 = 1.717362 | ν6 = 29.5 |
| R13 = 16.690 | D13 = 0.76 | | |
| R14 = 31.649 | D14 = 2.60 | N7 = 1.568832 | ν7 = 56.4 |
| R15 = −22.518 | D15 = Variable | | |
| R16 = ∞ | D16 = Variable | | |
| R17 = −27.137 | D17 = 1.00 | N8 = 1.603112 | ν8 = 60.6 |
| R18 = 38.796 | D18 = 0.50 | | |
| R19 = 168.825 | D19 = 3.30 | N9 = 1.622992 | ν9 = 58.2 |
| R20 = −22.295 | | | |

Various Data

| Focal Length | | 18.60 | 32.61 | 53.18 |
|---|---|---|---|---|
| Variable Space | D6 | 34.55 | 12.64 | 1.39 |
| | D15 | 0.00 | 6.50 | 16.04 |
| | D16 | 1.80 | 5.67 | 11.35 |

Aspheric Coefficients

R3:  A = 0.00000e+00    B = −7.12756e−06    C = −8.14594e−08
     D = 8.25107e−10    E = −1.72829e−12    F = 0.00000e+00
R4:  A = 0.00000e+00    B = −3.08638e−05    C = −1.98356e−07
     D = 1.37381e−09    E = −5.19629e−12    F = 0.00000e+00

Focal Length of Each Lens Unit

| L1 | −29.37 |
|---|---|
| L2 | 26.49 |
| L3 | −296.63 |

Numerical Example 4

F = 18.70-33.41-55.00  Fno = 3.47-4.43-5.88
2ω = 72.3-44.5-27.9

| | | | |
|---|---|---|---|
| R1 = 51.390 | D1 = 1.50 | N1 = 1.696797 | ν1 = 55.5 |
| R2 = 16.606 | D2 = 5.32 | | |
| *R3 = 37.640 | D3 = 1.80 | N2 = 1.560000 | ν2 = 52.0 |
| *R4 = 16.174 | D4 = 4.91 | | |
| R5 = 22.235 | D5 = 3.60 | N3 = 1.717362 | ν3 = 29.5 |
| R6 = 41.918 | D6 = Variable | | |
| *R7 = 19.563 | D7 = 2.60 | N4 = 1.603112 | ν4 = 60.6 |
| R8 = 151.940 | D8 = 2.46 | | |
| R9 = Stop | D9 = 2.50 | | |
| R10 = 21.110 | D10 = 3.60 | N5 = 1.563839 | ν5 = 60.7 |
| R11 = −49.770 | D11 = 0.27 | | |
| R12 = −29.285 | D12 = 4.00 | N6 = 1.834000 | ν6 = 37.2 |

-continued

Numerical Example 4

| R13 = 17.566 | D13 = 1.42 | | |
|---|---|---|---|
| R14 = 41.544 | D14 = 2.70 | N7 = 1.589130 | v7 = 61.1 |
| R15 = −22.611 | D15 = Variable | | |
| R16 = ∞ | | | |

Various Data

| Focal Length | | 18.70 | 33.41 | 55.00 |
|---|---|---|---|---|
| Variable Space | D6 | 38.48 | 13.47 | 0.99 |
| | D15 | 0.00 | 3.30 | 8.15 |

Aspheric Coefficients

| R3: | A = 0.00000e+00 | B = −3.46668e−06 | C = 2.67815e−08 |
|---|---|---|---|
| | D = 0.00000e+00 | E = 6.01345e−13 | F = 0.00000e+00 |
| R4: | A = 0.00000e+00 | B = −2.27695e−05 | C = −1.46388e−07 |
| | D = 8.23971e−10 | E = −3.15725e−12 | F = 0.00000e+00 |
| R7: | A = 0.00000e+00 | B = −1.44276e−06 | C = 7.10991e−09 |
| | D = 0.00000e+00 | E = 0.00000e+00 | F = 0.00000e+00 |

Focal Length of Each Lens Unit

| L1 | −33.56 |
|---|---|
| L2 | −31.65 |

Numerical Example 5 f = 18.56-35.01-53.40 Fno = 3.63-4.62-5.86
2ω = 72.6-42.6-28.6

| R1 = 50.000 | D1 = 1.50 | N1 = 1.712995 | v1 = 53.9 |
|---|---|---|---|
| R2 = 13.983 | D2 = 5.50 | | |
| R3 = −130.422 | D3 = 1.20 | N2 = 1.580000 | v2 = 52.0 |
| *R4 = 26.854 | D4 = 0.15 | | |
| R5 = 20.407 | D5 = 3.10 | N3 = 1.846660 | v3 = 23.9 |
| R6 = 43.180 | D6 = Variable | | |
| R7 = 111.324 | D7 = 1.70 | N4 = 1.517417 | v4 = 52.4 |
| R8 = −40.621 | D8 = 0.60 | | |
| R9 = Stop | D9 = 5.52 | | |
| R10 = 16.735 | D10 = 0.80 | N5 = 1.846660 | v5 = 23.9 |
| R11 = 11.736 | D11 = 4.50 | N6 = 1.487490 | v6 = 70.2 |
| R12 = −51.155 | D12 = Variable | | |
| R13 = −30.994 | D13 = 0.75 | N7 = 1.625882 | v7 = 35.7 |
| R14 = 10.339 | D14 = 2.60 | N8 = 1.740769 | v8 = 27.8 |
| R15 = 34.587 | D15 = Variable | | |
| R16 = −39.730 | D16 = 1.47 | N9 = 1.583060 | v9 = 30.2 |
| *R17 = −62.630 | D17 = 0.09 | | |
| R18 = −254.157 | D18 = 3.40 | N10 = 1.516330 | v10 = 64.1 |
| R19 = −18.291 | | | |

Various Data

| Focal Length | | 18.56 | 35.01 | 53.40 |
|---|---|---|---|---|
| Variable Space | D6 | 30.32 | 9.95 | 2.84 |
| | D12 | 2.56 | 6.68 | 9.66 |
| | D15 | 9.43 | 5.31 | 2.32 |

Aspheric Coefficients

| R4: | A = 0.00000e+00 | B = −3.62754e−06 | C = 6.47274e−08 |
|---|---|---|---|
| | D = −1.39220e−09 | E = 6.95422e−12 | F = 0.00000e+00 |
| R17: | A = 0.00000e+00 | B = 3.46999e−05 | C = 3.58952e−07 |
| | D = −5.44200e−09 | E = 3.00264e−11 | F = 4.77554e−14 |

Focal Length of Each Lens Unit

| L1 | −24.18 |
|---|---|
| L2 | 23.21 |
| L3 | −32.38 |
| L4 | 45.89 |

TABLE 1

| Condition | Numerical Example | | | | |
|---|---|---|---|---|---|
| | 1 | 2 | 3 | 4 | 5 |
| (1) | −0.026 | −0.058 | −0.046 | −0.054 | −0.034 |
| (2) | 0.298 | 0.267 | 0.278 | 0.272 | 0.292 |
| (3) | 1.62 | 1.58 | 1.6 | 1.56 | 1.58 |
| (4) | 0.91 | 1.03 | 1.27 | 1.56 | 1.58 |
| (5) | 0.76 | 0.70 | 0.60 | 0.40 | 1.52 |
| (6) | 0.59 | 0.58 | 0.63 | 0.56 | 0.77 |
| (7) | 0.60 | 0.60 | 0.70 | 0.59 | 0.80 |
| (8) | 0.11 | 0.12 | 0.19 | 0.09 | 0.20 |

An exemplary embodiment of a single-lens reflex camera system that uses, as a photographic optical system, a zoom lens (optical system) according to each exemplary embodiment of the present invention will be described below with reference to FIG. 11.

Referring to FIG. 11, the single-lens reflex camera includes a single-lens reflex camera body 10 and an exchangeable lens 11. The exchangeable lens 11 includes a zoom lens according to any of the first through fifth exemplary embodiments described above.

The single-lens reflex camera body 10 includes an image sensor (solid-state image sensor (recording unit) or a film) 12, such as a CCD sensor or a CMOS sensor, configured to receive light forming an object image (record an object image) via the exchangeable lens 11.

The single-lens reflex camera body 10 further includes a viewfinder optical system 13, via which a user of the camera can observe an object image formed via the exchangeable lens 11. The single-lens reflex camera body 10 further includes a pivotable quick return mirror configured to transfer the object image formed via the exchangeable lens 11 to the recording unit 12 and the viewfinder optical system 13.

When the user of the camera observes the object image via the viewfinder, the object image formed on a focusing plate 15 via the quick return mirror 14 is converted into an erect image via a pentagonal prism 16 and then the erect image is magnified by an eyepiece optical system 17 to allow the user to observe the magnified object image.

During shooting, the quick return mirror 14 pivotably moves in a direction indicated with an arrow in FIG. 11. Thus, the object image is formed on and recorded by the recording unit 12. The single-lens reflex camera body 10 further includes a sub mirror 18 and a focus detection sensor 19.

By applying the zoom lens according to each exemplary embodiment of the present invention to an image pickup apparatus such as a single-lens reflex camera or an exchangeable lens, an image pickup apparatus having a high optical performance can be implemented. The present invention can be applied to a single-lens reflex (SLR) camera that does not include a quick return mirror.

With the above-described configuration, each exemplary embodiment of the present invention can implement a small-size lightweight zoom lens having a high optical performance, which is useful in a photographic optical system that uses a solid-state image sensor. Furthermore, each exemplary embodiment of the present invention having the above-described configuration can implement an image pickup apparatus having the above-described zoom lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-302236 filed Nov. 27, 2008, which is hereby incorporated by reference herein in its entirety.

What is claimed is:

1. A zoom lens comprising, in order from an object side to an image side:
    a first lens unit having a negative refractive power; and
    a second lens unit having a positive refractive power,
    wherein an interval between the first and second lens units becomes smaller at a telephoto end than at a wide-angle end during zooming,
    wherein the first lens unit includes, in order from the object side to the image side:
        a first lens having a negative refractive power;
        a second lens having a negative refractive power, which is made of a plastic and has an aspheric lens surface; and
        a third lens having a positive refractive power, and
    wherein a refractive index and an Abbe number of the plastic (Nd, νd), a focal length of the second lens (fn), and a focal length of the first lens unit (f1) satisfy the following conditions:

$Nd-2.03+0.008 \cdot vd<0$ $Nd-1.97+0.0083 \cdot vd>0$ $1.55<Nd<1.65$ $0.5<fn/f1<2.0.$ 2. The zoom lens according to claim 1, wherein radii of curvature of lens surfaces of the second lens on the object side and the image side (Rp1, Rp2) satisfy the following condition:

$0.2<(Rp1-Rp2)/(Rp1+Rp2)<3.0.$

3. The zoom lens according to claim 1, wherein the focal length of the first lens unit (f1) and a focal length of the entire zoom lens at the wide-angle end (fw) satisfy the following condition:

$0.4<|fw/f1|<1.0.$

4. The zoom lens according to claim 1, wherein a focal length of the second lens unit (f2) and a focal length of the entire zoom lens at the wide-angle end (fw) satisfy the following condition:

$0.4<fw/f2<1.1.$

5. The zoom lens according to claim 1, wherein the first lens unit is configured to execute focusing by moving along an optical axis.

6. The zoom lens according to claim 1, wherein a fine rugged structural member, whose average pitch is 400 nm or less, is formed on at least one of lens surfaces of the second lens.

7. The zoom lens according to claim 1, wherein an average refractive index of materials of the first lens and the second lens (Nn) and a refractive index of a material of the third lens (Np) satisfy the following condition:

$0.06<Np-Nn<0.25.$

8. The zoom lens according to claim 1, further comprising a third lens unit having a negative refractive power and configured to move independently from other lens units during zooming, which is located on the image side of the second lens unit.

9. The zoom lens according to claim 1, further comprising:
    a third lens unit having a negative refractive power; and
    a fourth lens unit having a positive refractive power,
    wherein the third lens unit and the fourth lens unit are configured to move independently from other lens units during zooming, and both of the third lens unit and the fourth lens unit are located on the image side of the second lens unit.

10. An image pickup apparatus comprising:
    the zoom lens according to claim 1; and
    a solid-state image sensor configured to receive an image formed by the zoom lens.

* * * * *